Oct. 10, 1944.   V. R. KENNEY   2,360,141
FLUID COOLED BRAKE DRUM
Filed July 3, 1943

VERNON R. KENNEY
*INVENTOR*

BY *Smith & Tuck*
*ATTORNEY*

Patented Oct. 10, 1944

2,360,141

UNITED STATES PATENT OFFICE 2,360,141

FLUID COOLED BRAKE DRUM

Vernon R. Kenney, Bellingham, Wash.

Application July 3, 1943, Serial No. 493,409

4 Claims. (Cl. 188—152)

This invention relates to a fluid cooled brake drum and more particularly to brake drums for vehicles.

In the drawings illustrating the invention, I show my invention as applied to a braking mechanism of a hydraulic nature as used on automotive vehicles. It will, of course, be obvious that there are many other machines and apparatuses to which the invention is very readily applicable and with which any average skilled mechanic or engineer may easily and quickly combine the invention. Winches used in hoisting equipment, cableway equipment, logging machines, elevators and the like, all are ideal applications of the invention, but such further illustration with an invention as simple as the present would only serve to make the specification confusing rather than clear.

There is a considerable need for cooling systems for brake drums, especially in connection with large and heavy trucks designed to carry massive loads, where, in negotiating a downward course of travel and braking is essential, tremendous heats are created in the brake drums. There are a number of granted patents relating to and disclosing such systems. These systems are to be generally divided into two major groups, internal and external application of the cooling fluid. The present invention relates to the external application of the cooling fluid to a stationary or non-rotatable drum within which rotate the brake shoes that are expanded and contracted as braking is required or not required. One of the difficulties of such an arrangement which applicant has met is the provision of simple, mechanical means for bringing the brake shoes into action upon the non-rotatable inner surface of the brake drum in such a case, where the brake shoes rotate.

The cooling fluid in the present invention is conducted into and through a chamber that surrounds the actual braking surface of the brake drum and may be connected with certain temperature-reducing equipment as, for example, the radiation system of a common vehicle.

Among the more serious objections to constructions heretofore used are the great complexity and considerable number of parts in most structures, the extreme difficulty of construction and embodiment of the inventive principle in previously produced equipment, and their inefficiency in operation.

Thus it becomes apparent that the main purposes of this invention are to overcome these and many other recognized objections and, in so doing, to provide a simple and efficient as well as compact and economical construction which will have the least practical number of working parts, while at the same time adequately cooling the brake drum surface to avoid overheating or self-destruction.

According to a preferred embodiment of my invention, I mount upon a non-rotatable axle a brake drum that also does not rotate and which is provided with a cooling chamber to which and from which a coolant is conveyed. Mounted for rotation upon the non-rotatable axle is a wheel sleeve to which is secured the wheel for mutual rotation. Also mounted upon the wheel sleeve are the brake shoes and the operating equipment for expanding and contracting them, so that the brake shoes rotate within the brake drum in coacting relation with the braking surface thereof. Preferably the brake shoes are expanded and contracted by a double-acting hydraulic cylinder to which fluid under pressure is conveyed through suitable conduits. Pressure is applied axially of rotation of the shoes by the reciprocation of a piston through the instrumentality of a lever which may be operated by manual power from a point remote with respect to the wheel and axle assembly.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which Figure 1 is an axial sectional view of the invention, with portions broken away for convenience of illustration;

A braking mechanism, to overcome the defects hereinbefore enumerated, must have at least two totally distinct characteristics; it must be capable of operating simply to provide ready and rapid braking; and it must also be simple to install and to operate and not be subject to deterioration in use. Accordingly, a preferred embodiment of my invention, referring to Figure 1 of the drawings, is constituted by the structure therein shown as mounted upon and attached to the axle 10. Here the axle is tubular and has a stepped reduction as it progresses to the right in Figure 1 or to the outward end. By means of roller bearings 12 and 14 a wheel sleeve 16 is mounted for free rotation upon the axle 10, and the nut 18 threaded to the axle secures the sleeve 16 in place thereon against lateral displacement.

Figure 2:
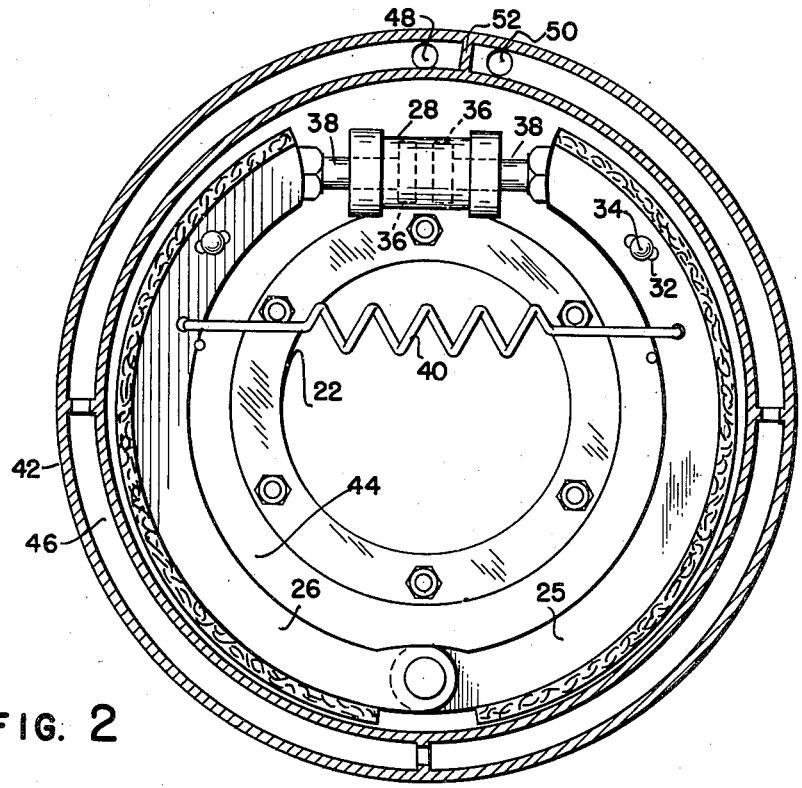
Figure 2 is a sectional view taken on line 2—2 of Figure 1.
Figure 3:
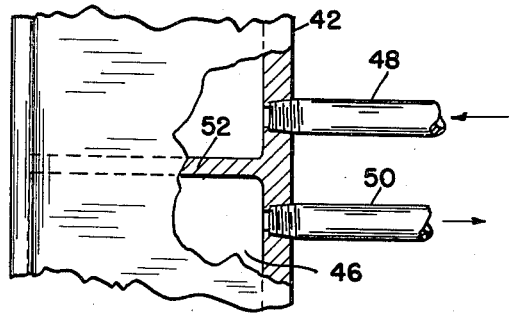
Figure 3 is a fragmentary plan view of a section of the brake drum showing the inlet and outlet conduits for the coolant fluid.

Sleeve 16 has an external flange 20 to which is bolted the wheel 21 by means of bolts 23 and nuts 24. Also mounted on the flange 20 is the drum 22 which extends inward from the shaft end and carries, as shown in Figure 2, the brake shoes 25 and 26, as well as the hydraulic operating cylinder 28. The shoes 25 and 26 are pinned at 30 to the flange of drum 22 and through the slots 32, 32 for movement relative to the pins 34, 34 in expansion to the braking position.

The hydraulic cylinder 28 is of conventional type and has a pair of opposed pistons 36 to which are attached piston rods 38 that are coupled to one or the other of the brake shoes 25 or 26.

Between the brake shoes is a return spring 40 which acts upon the release of the hydraulic fluid effect upon the pistons 36 to contract the brake shoes from the braking surface.

Figure 1:
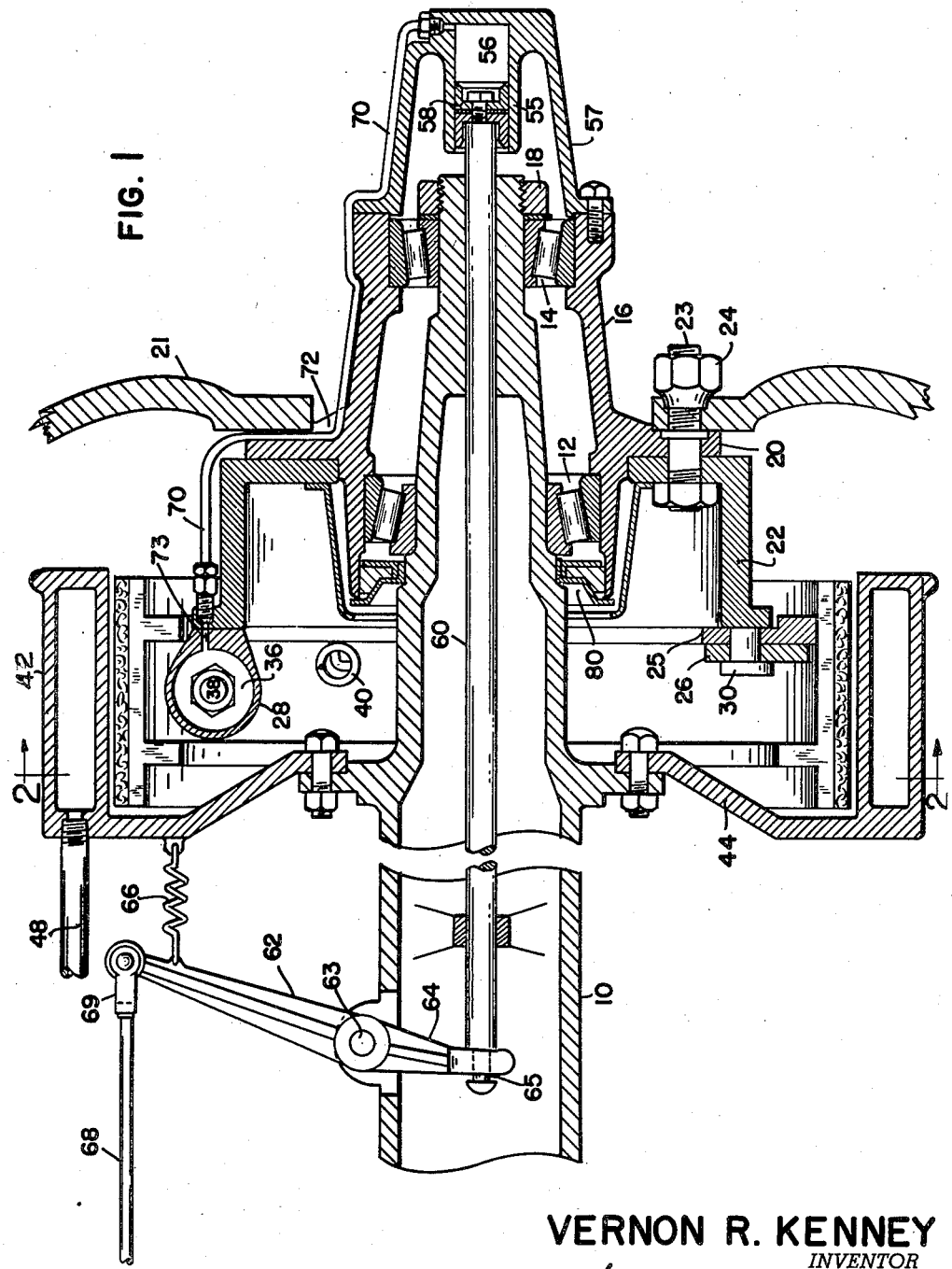

As can best be seen in Figure 1, the braking surface is constituted by a drum 42 securely mounted upon the non-rotatable shaft 10 by means of the flange 44. The brake drum is hollow, thus providing the coolant chamber 46 to which fluid is conducted by the conduit 48 and from which it is withdrawn by conduit 50, there being a dividing wall 52 between the orifices of the conduits 48 and 50. The inner braking surface 47 of the brake drum surrounds the braking surface of the brake shoes, against which the latter are pressed upon the application of hydraulic fluid under pressure to the pistons in cylinder 28.

Hydraulic fluid is pressurized in the chamber 56 at the axis of rotation by means of reciprocal movement of the piston 58 through the movement of the piston rod 60. The rod is actuated by the lever 62, pivoted at 63, through the instrumentality of arm 64 which is bifurcated to engage over the pin 65. Lever 62, which passes through a slot in the wall of axle 10, is drawn to the right in Figure 1 by means of the return spring 66. When it is desired to apply pressure to the hydraulic fluid the drag link 68 attached by clevis 69 to lever 62 is drawn to the left in Figure 1.

The chamber 56 is formed by the cylinder wall 55 mounted within the cover cap 57 that encloses the outboard bearing of sleeve 16. Fluid is conducted from chamber 56 through the conduit 70, which more or less follows the contour of the sleeve 16 lying in a groove at 72 to the injection orifice 73 to the interior of the chamber of the hydraulic cylinder 28.

A dust seal 80 is shown for the inboard bearing 12 of the sleeve 16.

When power is applied to draw the drag link 68 to the left of Figure 1, the piston rod 60 is forced to the right to drive the piston 58 into the chamber 56 a greater degree than normal. Hyhraulic fluid pressure is thus provided in the chamber 56 and this is conducted through conduit 70 and orifice 73 into the chamber of cylinder 28, whereupon the pistons 36, 36 are spread apart and the brake shoes are caused to swing about their pivotal connections 30 to press against the inner surface 47 of the brake drum. Upon the release of this fluid pressure from pistons 36, the springs 40 and 66 retract the mechanism to the at rest position, thus withdrawing fluid from the cylinder 28 to chamber 56.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A brake mechanism, comprising: a non-rotatable axle, a brake drum supported about said axle and having a fluid passage, means for conducting fluid to and from said drum, means rotatable upon said axle and carrying a brake shoe in braking relation to said drum, hydraulic means at the axis of rotation of said shoe for producing fluid pressure, and means responsive to pressure produced at the axis of rotation for engaging said shoe with said brake drum.

2. A brake mechanism, comprising: a non-rotatable axle, a brake drum supported about said axle and having a fluid passage, means for conducting fluid to and from said drum, a wheel rotatable upon said axle and carrying a brake shoe in braking relation to said drum, hydraulic means for actuating said shoe, a cylinder located on the axis of said wheel and rotatable therewith, a hydraulic fluid conduit from said cylinder to said hydraulic means, a piston reciprocally movable longitudinally along said wheel axis into and out of said cylinder, and means for reciprocating said piston.

3. A brake mechanism, comprising: a non-rotatable hollow axle, a brake drum supported about said axle and having a fluid passage, means for conducting fluid to and from said drum, a wheel rotatable upon said axle and carrying a brake shoe in braking relation to said drum, hydraulic means for actuating said shoe, a cylinder located on the axis of said wheel and rotatable therewith, a hydraulic conduit from said cylinder to said hydraulic means, a piston reciprocally movable longitudinally along said wheel axis into and out of said cylinder, a piston rod axially movable in said axle and operable upon said piston, a lever laterally mounted on said axle and connected to said piston rod, and means for swinging said lever.

4. A brake mechanism, comprising: a non-rotatable axle, a brake drum supported about said axle and having an annular fluid passage therearound, means for conducting fluid to and from said drum, a brake shoe having means rotatable upon said axle to support said shoe in braking relation to said drum, hydraulic means for actuating said shoe, a cylinder located on the axis of said rotatable brake shoe and rotatable therewith, a hydraulic fluid conduit from said cylinder to said hydraulic means, a piston reciprocally movable longitudinally along said wheel axis into and out of said cylinder, and means for reciprocating said piston.

VERNON R. KENNEY.